US007913341B1

(12) United States Patent
Morris et al.

(10) Patent No.: US 7,913,341 B1
(45) Date of Patent: Mar. 29, 2011

(54) COUNTERBALANCE MECHANISM FOR FOLD OUT RAMP

(75) Inventors: Donald Morris, Conifer, CO (US); Alan Cohn, Lockeford, CA (US)

(73) Assignee: Lift-U, a division of Hogan Mfg., Inc., Escalon, CA (US)

( * ) Notice: Subject to any disclaimer, the term of this patent is extended or adjusted under 35 U.S.C. 154(b) by 0 days.

(21) Appl. No.: 12/754,447

(22) Filed: Apr. 5, 2010

Related U.S. Application Data

(60) Provisional application No. 61/252,515, filed on Oct. 16, 2009.

(51) Int. Cl.
 *E01D 1/00* (2006.01)
(52) U.S. Cl. .......................... 14/71.3; 14/71.1
(58) Field of Classification Search .............. 74/53, 567, 74/569, 603; 14/71.1, 73.1
 See application file for complete search history.

(56) References Cited

U.S. PATENT DOCUMENTS

| | | | |
|---|---|---|---|
| 2,119,087 A * | 5/1938 | Stout .................................. 74/53 |
| 2,547,532 A | 4/1951 | Mendelsohn |
| 4,081,091 A | 3/1978 | Thorley |
| 4,274,172 A | 6/1981 | Franklin |
| 4,365,374 A | 12/1982 | Bennett |
| 4,499,970 A | 2/1985 | Hussey |
| 4,503,722 A | 3/1985 | Suzuki |
| 4,525,887 A | 7/1985 | Erlandsson |
| 4,550,623 A | 11/1985 | Gysling |
| 4,571,775 A | 2/1986 | Leonard |
| 4,621,391 A | 11/1986 | Leonard |
| 4,627,784 A | 12/1986 | Collins |
| 4,657,233 A | 4/1987 | Vroom |
| 4,665,579 A | 5/1987 | Bennett |
| 4,691,956 A | 9/1987 | Hodge |
| 4,797,042 A | 1/1989 | McFarland |
| 4,836,736 A | 6/1989 | Neagu |
| 4,873,791 A | 10/1989 | Lyons, Sr. |

(Continued)

FOREIGN PATENT DOCUMENTS

DE 4413444 A1 10/1995

(Continued)

OTHER PUBLICATIONS

"Mechanical Dock Levelers," K&K Material Handling, n.d., <http://www.knkmaterialhandling.com/Dock/Frame_DockProducts.htm> [retrieved Jul. 17, 2009], 7 pages.

(Continued)

*Primary Examiner* — Gary S Hartmann
(74) *Attorney, Agent, or Firm* — Christensen O'Connor Johnson Kindness PLLC

(57) ABSTRACT

A ramp assembly has a ramp portion configured for reciprocating movement between a stowed position, a deployed position, and a neutral position, and a counterbalance. The counterbalance includes a restraint slidably coupled to a driving element having a spring fitting. The drive element includes a first engagement surface for engaging a first bearing surface associated with the ramp portion and a second engagement surface for engaging a second bearing surface associated with the ramp portion. A compression spring is disposed between a portion of the restraint and the spring fitting so that the compression spring provides a force to bias the ramp portion toward the stowed position when the ramp portion is between the deployed position and the neutral position, and toward the deployed position when the ramp portion is between the stowed position and the neutral position.

12 Claims, 10 Drawing Sheets

U.S. PATENT DOCUMENTS

| | | | |
|---|---|---|---|
| 4,907,936 A | 3/1990 | Bourdage | |
| 4,950,124 A | 8/1990 | Burghart | |
| 5,040,936 A | 8/1991 | Rhea | |
| 5,085,555 A | 2/1992 | Vartanian | |
| 5,111,912 A | 5/1992 | Kempf | |
| 5,145,310 A | 9/1992 | Calzone | |
| 5,224,722 A | 7/1993 | Kempf | |
| 5,253,410 A | 10/1993 | Mortenson | |
| 5,306,113 A | 4/1994 | Mann | |
| 5,316,432 A | 5/1994 | Smalley | |
| 5,358,301 A | 10/1994 | Konchan | |
| 5,375,962 A | 12/1994 | Kempf | |
| 5,391,041 A | 2/1995 | Stanbury | |
| 5,392,481 A | 2/1995 | Hageman | |
| 5,449,267 A | 9/1995 | Ablabutyan | |
| 5,865,593 A | 2/1999 | Cohn | |
| 5,871,329 A | 2/1999 | Tidrick | |
| 5,988,724 A | 11/1999 | Wolda | |
| 6,010,298 A | 1/2000 | Cohn | |
| 6,112,353 A | 9/2000 | Winter | |
| 6,125,491 A | 10/2000 | Alexander | |
| 6,196,609 B1 | 3/2001 | Bowers | |
| 6,203,265 B1 | 3/2001 | Cohn | |
| 6,210,098 B1 | 4/2001 | Cohn | |
| 6,238,168 B1 | 5/2001 | Cohn | |
| 6,409,458 B1 | 6/2002 | Cohn | |
| 6,602,041 B2 | 8/2003 | Lewis | |
| 6,647,898 B2 * | 11/2003 | Li | 105/458 |
| 6,698,998 B2 | 3/2004 | Koretsky | |
| 6,718,886 B2 | 4/2004 | Engle | |
| 6,769,149 B2 | 8/2004 | Alexander | |
| 6,843,635 B2 | 1/2005 | Cohn | |
| 6,964,445 B1 | 11/2005 | Bellis, Jr. | |
| 6,988,289 B2 | 1/2006 | Pedersen | |
| 7,029,050 B1 | 4/2006 | Johnson | |
| 7,156,441 B2 | 1/2007 | Austin | |
| 7,228,582 B1 | 6/2007 | Jones | |
| 7,264,433 B2 | 9/2007 | Navarro | |
| 7,353,558 B2 | 4/2008 | Alexander | |
| 7,500,818 B1 | 3/2009 | Johnson | |
| 7,533,432 B2 * | 5/2009 | Morris et al. | 14/71.3 |
| 7,533,433 B2 * | 5/2009 | Morris et al. | 14/71.3 |
| 7,533,434 B2 * | 5/2009 | Morris et al. | 14/71.3 |
| 7,681,272 B2 * | 3/2010 | Morris et al. | 14/71.3 |
| 2002/0197141 A1 | 12/2002 | Cohn | |
| 2004/0096304 A1 | 5/2004 | Lewis | |
| 2004/0136820 A1 | 7/2004 | Cohn | |
| 2008/0006105 A1 | 1/2008 | Ko | |
| 2008/0271267 A1 * | 11/2008 | Morris et al. | 14/71.1 |
| 2008/0271269 A1 * | 11/2008 | Morris et al. | 14/71.1 |
| 2008/0273956 A1 | 11/2008 | Morris | |
| 2009/0271934 A1 * | 11/2009 | Morris et al. | 14/71.3 |

FOREIGN PATENT DOCUMENTS

| | | |
|---|---|---|
| DE | 297 07 803 U1 | 10/1997 |
| DE | 102004048761 A1 | 4/2006 |
| EP | 0875421 A1 | 11/1998 |
| EP | 1 844 980 A2 | 4/2007 |
| GB | 585917 | 2/1947 |
| GB | 2 116 940 A | 10/1983 |
| GB | 2 274 092 A | 7/1994 |
| GB | 2 306 152 A | 4/1997 |
| GB | 2306152 A | 4/1997 |
| GB | 2369344 A | 5/2002 |
| JP | 07-108867 | 4/1995 |
| JP | 2001-239888 | 9/2001 |
| JP | 2008-230270 | 10/2008 |
| WO | 01/47746 A1 | 7/2001 |

OTHER PUBLICATIONS

Fall Protection Systems, Inc. <retrieved on Jul. 14, 2009 from: http://www.fallprotectionsystems.com/access_systems.html>.

* cited by examiner

COUNTERBALANCE MECHANISM FOR FOLD OUT RAMP

TECHNICAL FIELD

The present disclosure relates generally to wheelchair lifts and, more particularly, to fold out ramps for vehicles.

BACKGROUND

The Americans with Disabilities Act (ADA) requires the removal of physical obstacles to those who are physically challenged. The stated objective of this legislation has increased public awareness and concern over the requirements of the physically challenged. Consequentially, there has been more emphasis on providing systems that assist such people to access a motor vehicle, such as a bus or minivan.

A common manner of providing the physically challenged with access to motor vehicles is a ramp. Various ramp operating systems for motor vehicles are known in the art. Some slide out from underneath the floor of the vehicle and tilt down. Others are stowed in a vertical position and are pivoted about a hinge, while still others are supported by booms and cable assemblies. The present invention is generally directed to a "fold out" type of ramp. Such a ramp is normally stowed in a horizontal position within a recess in the vehicle floor, and is pivoted upward and outward to a downward-sloping extended position. In the extended position, the ramp is adjustable to varying curb heights.

Fold out ramps on vehicles confront a variety of technical problems. Longer ramps are desirable because the resulting slope is more gradual and more accessible by wheelchair-bound passengers. Longer ramps are, however, heavier and require more torque about the hinge to be reciprocated between deployed and stowed positions. To satisfy this torque requirement, such fold-out ramps use large electric motors, pneumatic devices, or hydraulic actuators to deploy and stow the ramp. Many of such systems cannot be moved manually in the event of failure of the power source unless the drive mechanism is first disengaged. Some existing fold-out ramps can be deployed or stowed manually, but they are difficult to operate because one must first overcome the resistance of the drive mechanism.

As noted above, many existing fold-out ramps are equipped with hydraulic, electric, or pneumatic actuating devices. Such devices are obtrusive and make access to and from a vehicle difficult when the ramp is stowed. Moreover, many of such fold-out ramps have no energy storage capabilities to aid the lifting of the ramp, and thereby preserve the life of the drive motor or even allow a smaller drive to be employed. Finally, operating systems for such fold-out ramps must have large power sources to overcome the torque placed on the hinge by the necessarily long moment arm of the fold-out ramp.

SUMMARY

A ramp assembly has a ramp portion and a counterbalance. The counterbalance is configured for reciprocating movement between a stowed position, a deployed position, and a neutral position. The counterbalance includes first and second bearing surfaces associated with the ramp portion so that movement of the ramp portion between the stowed position and the deployed position moves the first bearing surface along a first arcuate path and moves the second bearing surface along a second arcuate path. The counterbalance further includes a restraint, a drive element, and a compression spring. The restraint is rotatably coupled about a first axis of rotation, wherein the first axis of rotation has a fixed position relative to the neutral position of the ramp portion. The drive element is slidably coupled to the restraint and includes a first engagement surface for engaging the first bearing surface and a second engagement surface for engaging the second bearing surface. The drive element also includes a spring fitting. The compression spring is disposed between a portion of the restraint and the spring fitting so that the compression spring provides a force to bias the ramp portion toward the stowed position when the ramp portion is located between the deployed position and the neutral position, and toward the deployed position when the ramp portion is located between the stowed position and the neutral position.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

Exemplary embodiments of the present invention will now be described with reference to the accompanying drawings where like numerals correspond to like elements. The disclosed embodiments are directed to ramp assemblies, and specifically, to wheelchair ramp assemblies. In particular, described embodiments are directed to wheelchair ramp assemblies suitable for use in buses, vans, etc.

The following discussion proceeds with reference to examples of wheelchair ramp assemblies for use in vehicles having a floor, such as a bus, van, etc. While the examples provided herein have been described with reference to their association with vehicles, it will be apparent to one skilled in the art that this is done for illustrative purposes and should not be construed as limiting the scope of the claimed subject matter. Thus, it will be apparent to one skilled in the art that aspects of the present disclosure may be employed with other ramp assemblies used in stationary installations, such as residential buildings and the like.

The following detailed description may use illustrative terms such as vertical, horizontal, front, rear, curbside, roadside, inboard, outboard, proximal, distal, etc. However, these terms are descriptive in nature and should not be construed as limiting. Further, it will be appreciated that embodiments of the present disclosure may employ any combination of features described herein.

Figure 1:
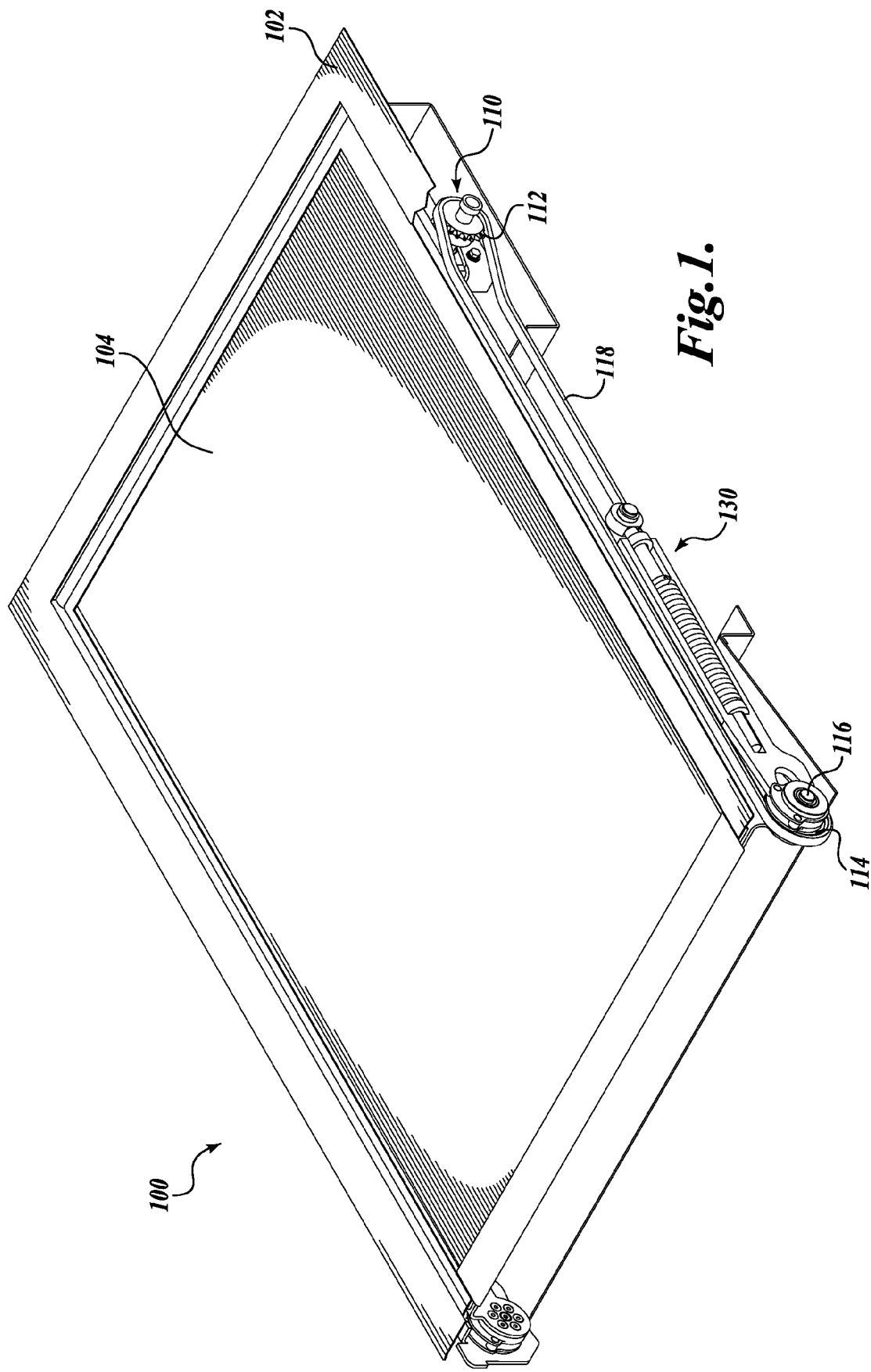
FIG. 1 shows an isometric view of a fold out ramp having a counterbalance mechanism, wherein a ramp portion is shown in the stowed position.
Figure 2:
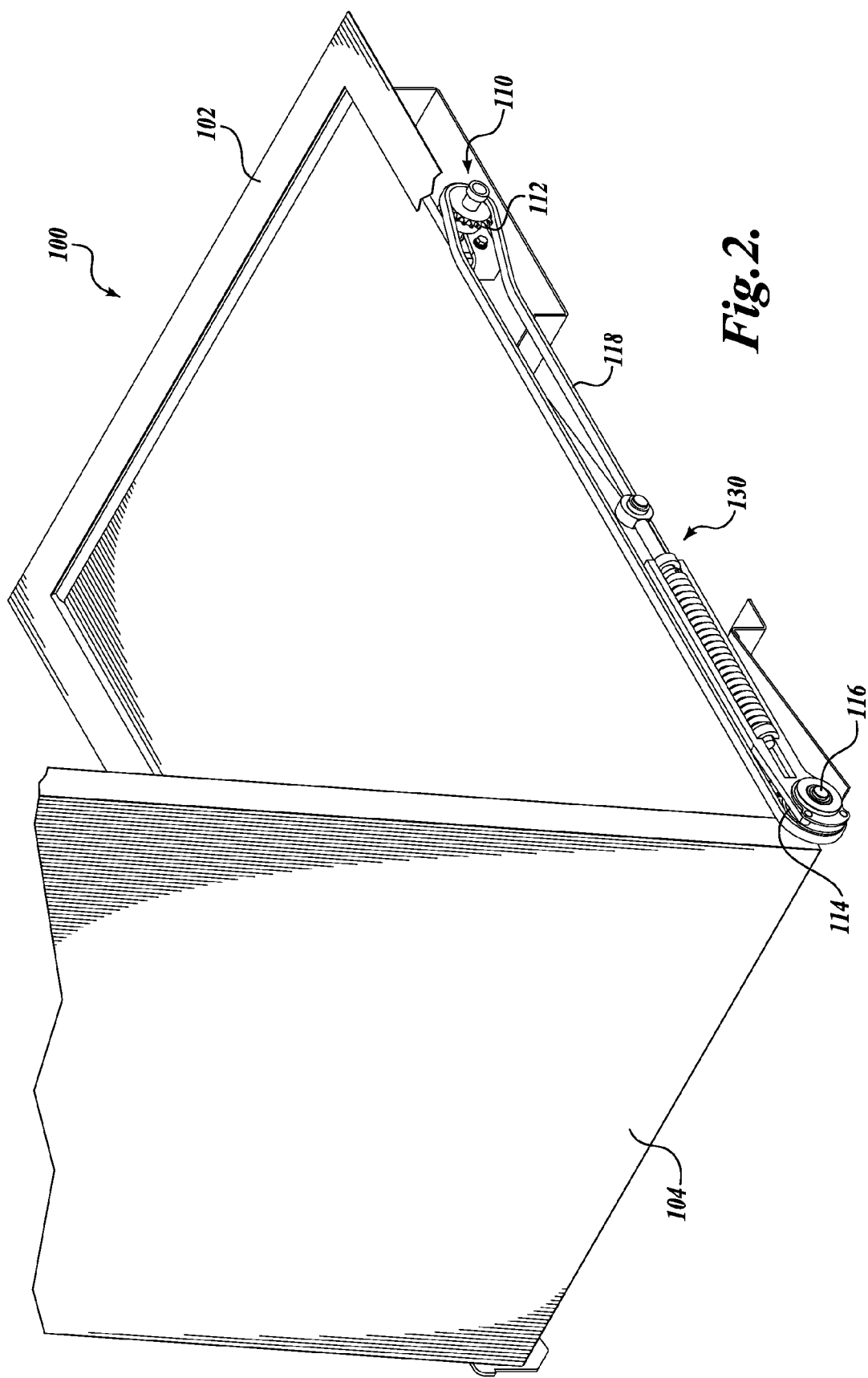
FIG. 2 shows an isometric view of the fold out ramp of FIG. 1, with the ramp portion located between the stowed position and a deployed position.
Figure 3:
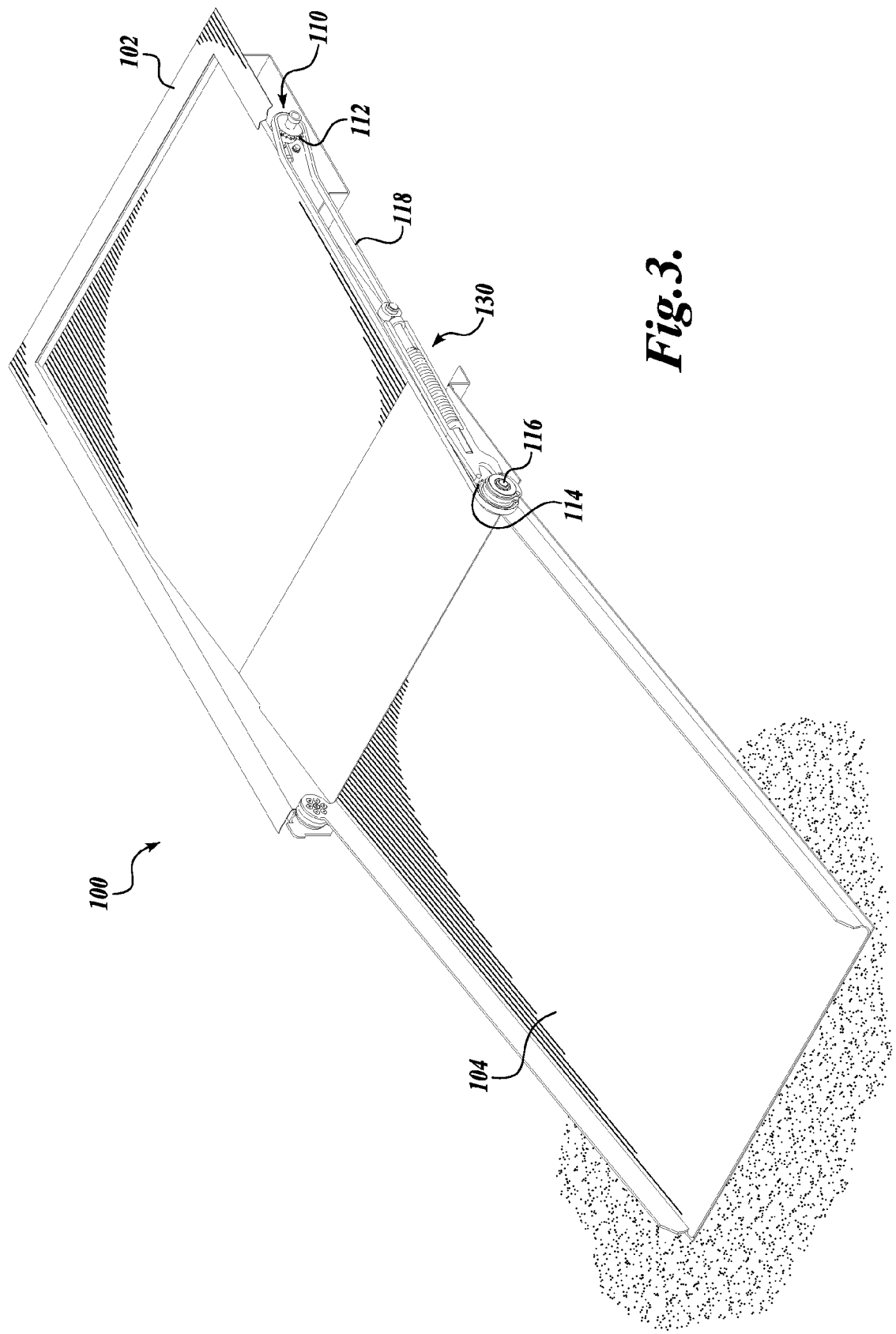
FIG. 3 shows an isometric view of the fold out ramp of FIG. 1, with the ramp portion in a deployed position.

FIGS. 1-3 illustrate an exemplary embodiment of a fold out ramp assembly 100 (hereinafter the "ramp assembly 100") suitable for use with the described counterbalance assemblies. The ramp assembly 100 is adapted to be mounted to a vehicle (not shown), such as a bus or a van and includes a ramp portion 104. The ramp portion 104 is mounted to be rotatable about one end so that the ramp portion 104 is reciprocal between the stowed position, as shown in FIG. 1, and a deployed position, as shown in FIG. 3.

When a ramp assembly is installed in a vehicle, some components of the ramp assembly 100 may maintain a fixed relationship relative to the vehicle structure. Other components may move relative to the vehicle structure when the ramp reciprocates between a stowed position and a deployed position. Similarly, when a ramp assembly is installed in a stationary installation, such as a residential building and the like, some components of the ramp assembly may maintain a fixed relationship relative to the building structure, while other components move relative to the building structure when the ramp reciprocates between a stowed position and a deployed position. As illustrated, the ramp assembly of FIGS. 1-3 includes a fixed portion 102. For such embodiments, the fixed portion 102 of the ramp assembly 100 maintains a fixed relationship to the vehicle or other structure to which the ramp assembly is mounted. It will also be appreciated that the fixed portion of the ramp assembly also maintains a fixed relationship to any defined ramp position. That is, the fixed portion 102 of the ramp assembly 100 can be described as having a fixed relationship to the stowed position of the ramp portion, i.e., to the ramp portion when the ramp portion is in the stowed position. Similarly, the fixed portion of the ramp assembly can be described as having a fixed relationship to the neutral position of the ramp portion, which is the position in which the center of gravity of the ramp portion 104 is positioned so that the weight of the ramp portion does not impart a moment that tends to rotate the ramp portion toward the stowed position or a deployed position. Alternate embodiments that do not include a fixed portion are also possible. For such embodiments, the ramp portion is rotatably coupled directly to a portion of the vehicle or other structure to which the ramp assembly is mounted.

Movement of the ramp portion 104 is powered by a motor (not shown), which is operatively coupled to the ramp portion with a transmission assembly 110. The transmission assembly includes a roadside sprocket 112 operatively coupled to the drive shaft of the motor and located toward the roadside portion of the ramp assembly 100. A curbside sprocket 114 is positioned along the curbside end of the ramp assembly. In the illustrated embodiment, the curbside sprocket 114 is fixedly coupled to an output shaft 116 that operably couples the ramp portion 104 to a counterbalance assembly 130. The output shaft 116 is operatively coupled to the ramp portion so that rotation of the curbside sprocket 114 in a first direction actuates the ramp portion 104 towards the stowed position, and rotation of the curbside sprocket in a second direction actuates the ramp portion towards a deployed position. A chain 118 forms an endless loop that engages the curbside sprocket 114 and the roadside sprocket 112 so that rotation of the roadside sprocket rotates the curbside sprocket 114, thus actuating the ramp portion.

The illustrated transmission assembly is exemplary only and should not be considered limiting. For example, although the transmission assembly 110 is described as a combination of sprockets 112 and 114 and a chain 118, other known transmission assemblies may be utilized, including but not limited to a plurality of gears, a belt and pulleys, etc. It is also anticipated that the drive shaft of the motor can be directly coupled to the ramp portion provide an actuating force to the ramp portion. It will be apparent to one of ordinary skill the art that these and other variations to the transmission assembly are possible. Accordingly, such alternate embodiments should be considered within the scope of the present disclosure.

In the illustrated embodiment, the output shaft 116 serves as a pivot axis for the ramp portion 104 to which the curbside sprocket 114 is attached. That is, the axis of rotation of the output shaft 116 is coincident to the center of rotation of the ramp portion 104 as the ramp portion reciprocates between the stowed position and a deployed position. It should be appreciated that the output shaft 116 need not be so located. One of ordinary skill in the art would recognize that the location and orientation of the output shaft 116 can differ with the inclusion of various known transmission elements to couple the output shaft 116 to the ramp portion 104. Also envisioned are embodiments wherein the driveshaft that couples the motor to the roadside sprocket 112 acts as an output shaft 116, i.e., the shaft to which the counterbalance 130 is attached. Such a configuration would allow the counterbalance assembly to be located internal to the ramp assembly 100, i.e. under the ramp portion 104 when the ramp portion is in the stowed position. It should be appreciated that the output shaft 116 can be any shaft associated with the ramp assembly 100 that rotates in a first direction when the ramp portion 104 moves toward the stowed position and in a second direction when the ramp portion moves toward a deployed position.

Figure 6:
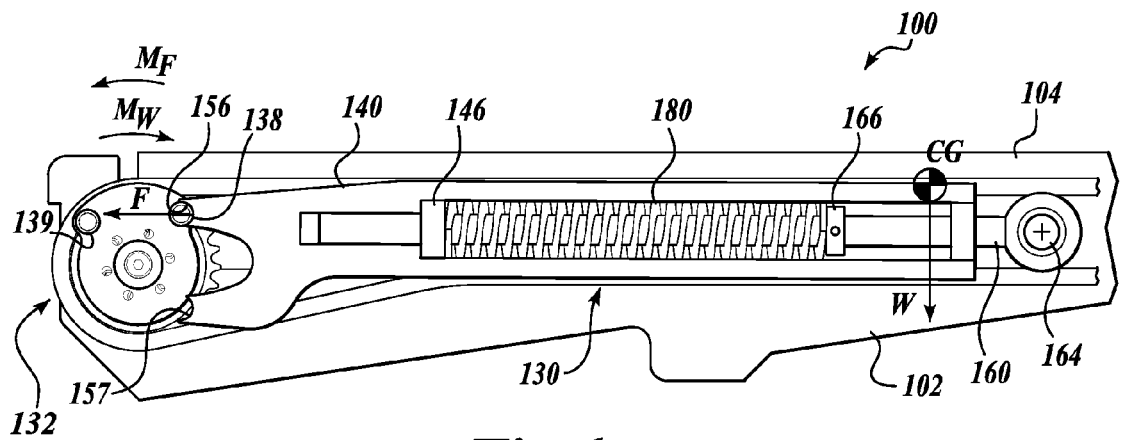
FIG. 6 shows a side view of the counterbalance assembly of FIG. 5, with the ramp portion in the stowed position.
Figure 7:
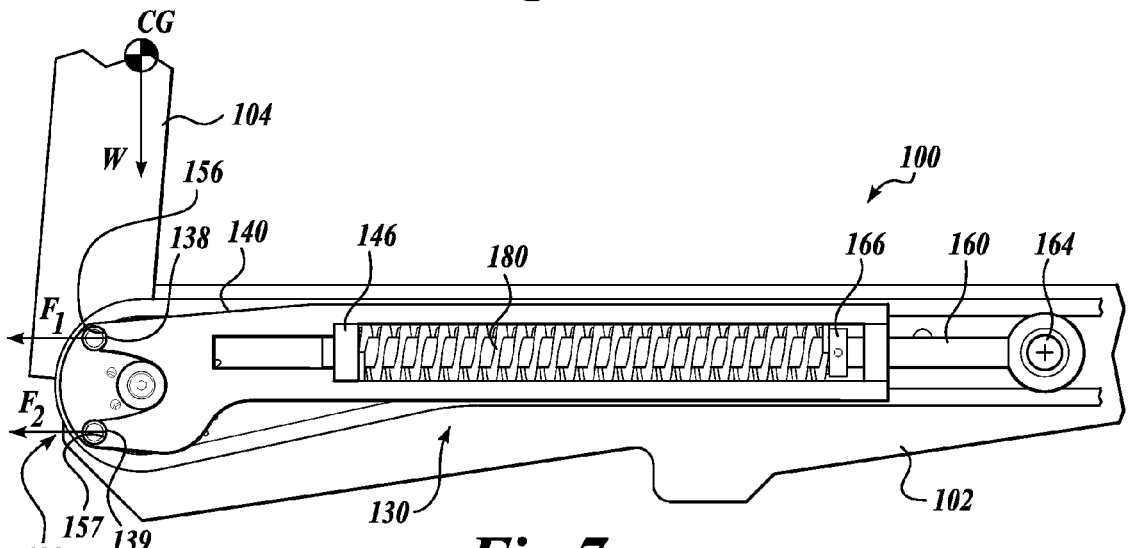
FIG. 7 shows a side view of the counterbalance assembly of FIG. 5, with the ramp portion in the neutral position.
Figure 8:
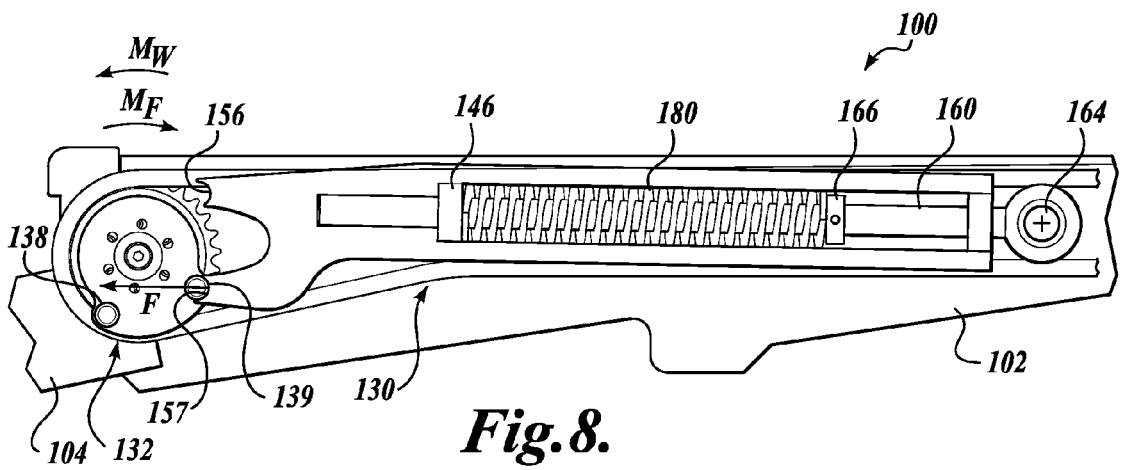
FIG. 8 shows a side view of the counterbalance assembly of FIG. 5, with the ramp portion in a deployed position.

FIGS. 6-8 show the ramp assembly 100 as the ramp portion 104 rotates from the stowed position (FIG. 6) through the neutral position (FIG. 7) to a deployed position (FIG. 8). Referring to FIG. 6, when the ramp is in the stowed position, the weight of the ramp portion 104, which is idealized as a force W acting at the CG, is positioned roadside of the center of rotation of the ramp portion 104 and imparts a moment $M_W$ on the ramp portion 104 that tends to rotate the ramp portion away from the neutral position and toward the stowed position. Similarly, when the ramp portion 104 is in a deployed position, as shown in FIG. 8, the weight W of the ramp portion imparts a moment $M_W$ on the ramp portion that tends to rotate the ramp portion away from the neutral position and toward a deployed position. The moment $M_W$ is the product of the weight W of the ramp portion 104 multiplied by moment arm $d_W$, which is the horizontal distance between the center of rotation and the CG of the ramp portion 104. As the ramp portion 104 moves from either the stowed position or a deployed position toward the neutral position, the moment arm $d_W$ decreases according to the cosine of the angle of the ramp portion relative to a horizontal plane. As a result, the moment $M_W$ also decreases according to the cosine of the angle of the ramp portion relative to a horizontal plane as the ramp portion 104 moves toward the neutral position.

As shown in FIG. 7, when the ramp portion 104 is in the neutral position, the CG of the ramp portion 104 is located directly over the center of rotation of the ramp portion 104, i.e., $d_W=0$. As a result, the weight W of the ramp portion 104 does not impart any moment about the center of rotation of the ramp portion 104. In the illustrated embodiment, the neutral position is depicted as occurring when the ramp is in a substantially vertical position. It should be appreciated, however, that the position of the CG can vary according to the configuration of the ramp portion 104. Accordingly, the neutral position, i.e. the position at which the CG is located above the center of rotation of the ramp portion 104, can also vary according to the configuration of the ramp portion 104.

Figure 4:
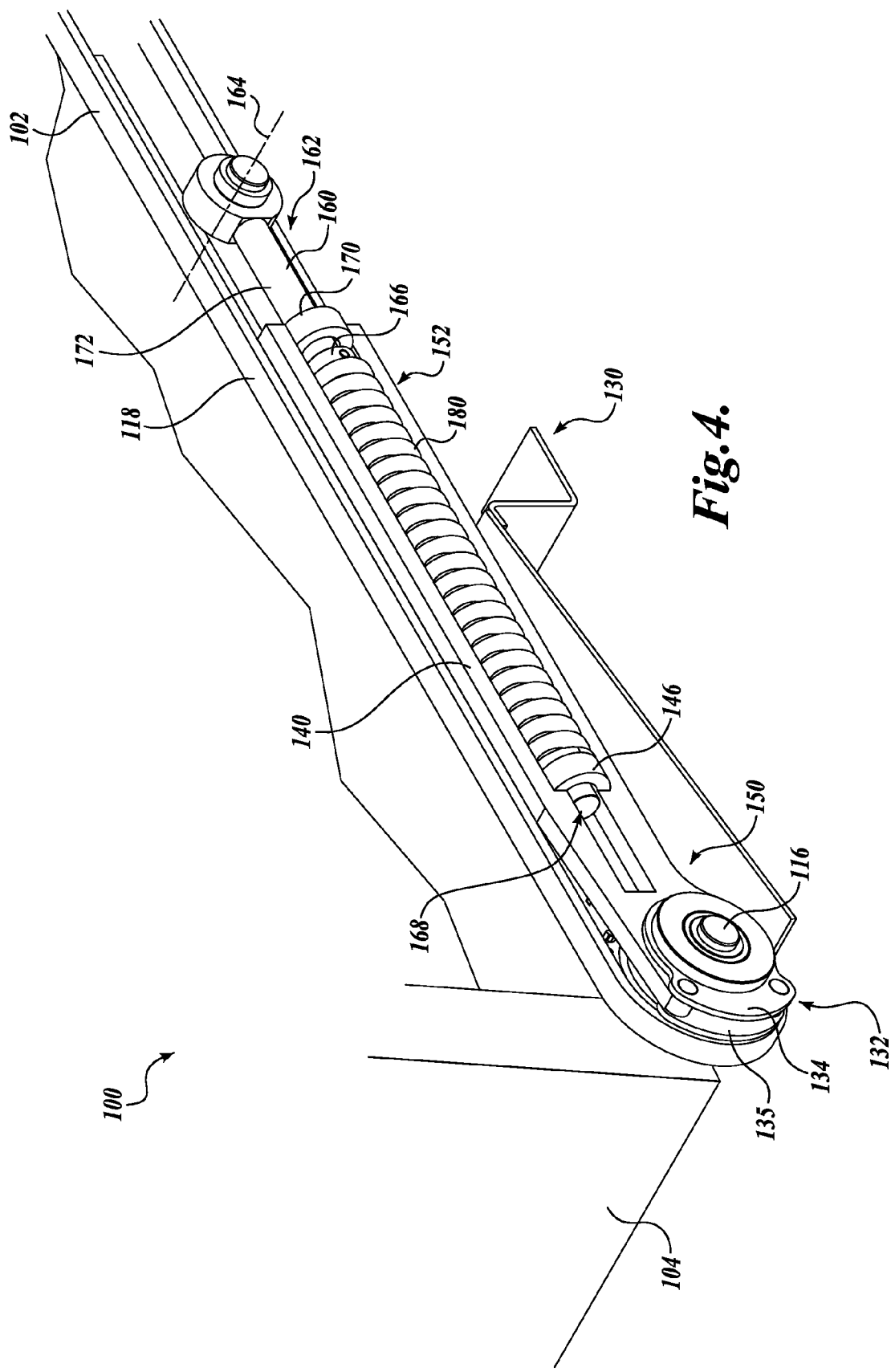
FIG. 4 shows an isometric view of a first exemplary embodiment of the counterbalance assembly of FIG. 1.
Figure 5:
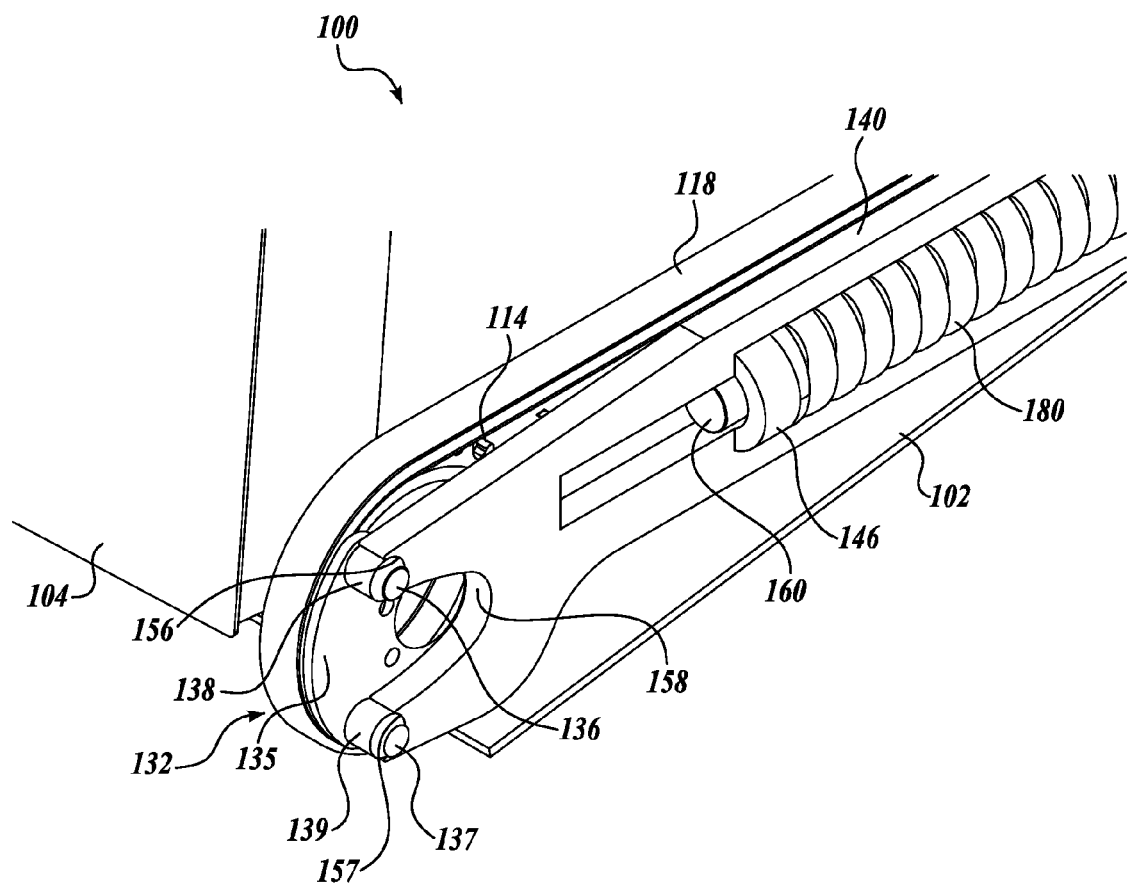
FIG. 5 shows an isometric view of a crank assembly of the counterbalance of FIG. 4, with a forward bearing plate removed from the crank assembly.

Referring now to FIGS. 4-8, a first exemplary embodiment of a counterbalance assembly 130 is shown. As best shown in FIGS. 4 and 5, the counterbalance assembly 130 includes a crank assembly 132 coupled to the output shaft 116 so that the crank assembly rotates in a first direction when the ramp portion 104 moves toward the stowed position and in a second direction when the ramp portion 104 moves toward a deployed position. While the output shaft 116 of the illustrated embodiment is part of the transmission assembly 110, alternate embodiments are contemplated wherein the output shaft is separate from the transmission assembly. In this regard, the output shaft 116 can be any shaft configured to rotate in a first direction when the ramp portion 104 moves toward the stowed position, and in a second direction when the ramp portion moves toward the deployed position.

In the illustrated embodiment, the crank assembly 132 includes a forward bearing plate 134 offset from and substantially parallel to a rear bearing plate 135. Referring to FIG. 5, wherein the forward bearing plate 134 and output shaft 116 are removed for clarity, a first pin 136 and a second pin 137 extend from the forward bearing plate 134 to the rear bearing plate 135. An exterior portion of the first pin 136 defines a first bearing surface 138, and an exterior portion of the second pin 137 defines a second bearing surface 139. The first and second pins 136 and 137 are offset from the center of rotation of the output shaft 116 so that rotation of the output shaft drives the first pin 136, and therefore a first bearing surface 138, along a first arcuate path and the second pin 137, and therefore the second bearing surface 139, along a second arcuate path.

Various alternate embodiments of the disclosed crank assembly 132 are possible. In one alternate embodiment, the first and second bearing surfaces 138 and 139 are defined by first and second roller bearings that extend between the first and second bearing plates 135 and 136, wherein each roller bearing has an axis of rotation parallel to the axis of rotation of the output shaft 116. In another alternate embodiment, the first and second bearing surfaces 138 and 139 are defined by separate portions of a single machined fitting. In the disclosed embodiment, the crank assembly is symmetric about a horizontal plane passing through the center of rotation of the output shaft, however, in yet another alternate embodiment, the first and second bearing surfaces 138 and 139 are located different differences from the center of rotation of the output shaft 116 so that the first arcuate path traveled by the first bearing surface 138 has a different radius than that of the second arcuate path traveled by the second bearing surface 139. In addition to being located different distances from the center of rotation of the output shaft 116, the first and second bearing surfaces 138 and 139 can be located different distances from the center of rotation of the output shaft 116 in the vertical direction, the horizontal direction, or both. These and other changes to the illustrated crank assembly 132 are contemplated and should be considered within the scope of the present disclosure.

As best shown in FIG. 4, a restraint 160 is rotatably coupled at a proximal end 162 for rotational movement about an axis of rotation 164. The axis of rotation 164 is fixedly positioned relative to the neutral position of the ramp portion 104. For ramp assemblies 100 having a fixed portion 102, such as the embodiment shown in FIGS. 4-8, the restraint 160 can be coupled to a fixed portion of the ramp assembly. Alternately, the restraint 160 can be coupled to a portion of the vehicle to which the ramp assembly 100 is mounted or to any other structure that maintains a fixed position relative to the neutral position of the ramp portion 104. A portion of the restraint 160 defines an end stop 166.

In the illustrated embodiment, the restraint 160 comprises a cylindrical rod 172 extending along the forward edge of the ramp assembly. The form and orientation of the illustrated rod are exemplary only, and should not be considered limiting. In this regard, various changes to the shape and configuration of the rod are contemplated and should be considered within the scope of the present disclosure. Further, while the end stop 166 is illustrated as a separate fitting attached to the rod 172 between the distal end 168 and the proximal end 162 of the rod, the location and shape of the end stop can vary. Moreover, the end stop 166 can be integrally formed with the rod 172.

A drive element 140 is slidingly coupled to the restraint 160. As best shown in FIG. 4 a proximal end 150 of the drive element 140 includes a first engagement surface 156 sized and configured to engage the first bearing surface 138 of the crank assembly 132. The proximal end 150 of the drive element 140 also includes a second engagement surface 157 sized and configured to engage the second bearing surface 139 of the crank assembly 132. In the illustrated embodiment, the first and second engagement surfaces 156 and 157 are recesses formed in the drive element 140, however, it should be appreciated that the size and shape of the engagement surfaces can change to accommodate differently shaped bearing surfaces 138 and 139 without departing from the scope of the present disclosure. As shown in FIG. 5, a recess 158 is formed in the proximal end 150 of the drive element 140 between the first and second engagement surfaces 156 and 157 to provide clearance between the drive element 140 and the output shaft 116 through the full range of motion of the counterbalance assembly 130.

In the illustrated embodiment, the drive element 140 has an elongate body extending along the side of the ramp assembly. The form and orientation of the illustrated elongate body are exemplary only, and should not be considered limiting. In this regard, various changes to the shape and configuration of the body are contemplated and should be considered within the scope of the present disclosure. A spring fitting 146 is disposed on the drive element 140 between the proximal and distal ends 150 and 152 of the drive element. A guide 170 is located on the distal end 152 of the drive element 140. The spring fitting 146 and guide 170 are illustrated as being integral with the drive element 140, however alternate embodiments are possible wherein one or both of the spring fitting and guide are formed separately and then attached to the restraint 160.

The drive element 140 is slidably coupled to the restraint 160. More specifically, in the illustrated embodiment, the rod of the restraint 160 engages the spring fitting 146 and the guide 170 for sliding translation. The end stop 166 is located between the guide 170 and the spring fitting 146, and a compression spring 180 is disposed between the end stop and the spring fitting. In the illustrated embodiment, the rod 172 portion of the restraint 160 is concentrically disposed within the compression spring 180.

Referring now to FIGS. 6-8, as the ramp portion 104 reciprocates between the stowed position (FIG. 6) and a deployed position (FIG. 8), the distance between the spring fitting 146 and the end stop 166 changes. As shown in FIG. 7, when the ramp portion is in the neutral position, the first bearing surface 138 is engaged with the first engagement surface 156, and the second bearing surface 139 is engaged with the second engagement surface 157. In this position, the compression spring 180 is at maximum extension and thus, the force F provided by spring is at a minimum. The force F, which acts in the direction of the centerline of the spring 180, is reacted by bearing surfaces 138 and 139. In this regard, force $F_1$ is reacted at the first bearing surface 138, and force $F_2$ is reacted at the second bearing surface 139, wherein $F=F_1+F_2$. Forces $F_1$ and $F_2$ both have a line of action parallel to force F. Further, when the ramp portion 104 is in the neutral position, the relative magnitudes of force $F_1$ and $F_2$ are such that the net moment M imparted about the center of rotation of the crank assembly 132 is zero. More specifically, force $F_1$ imparts a first moment about the center of rotation of the crank assembly 132 that is equal to $F_1 \times d_1$, wherein $d_1$ is the distance between the center of rotation of the crank assembly and the line of action of force $F_1$. At the same time, force $F_2$ imparts a second, equal and opposing moment about the center of rotation of the crank assembly 132 that is equal to $F_2 \times d_2$, wherein $d_2$ is the distance between the center of rotation of the crank assembly and the line of action of force $F_2$. As a result, when the ramp portion 104 is in the neutral position, the weight W of the ramp portion imparts no moment about the center of rotation of the ramp portion, and the counterbalance assembly 130 imparts no net moment about the center of rotation of the crank assembly 132. Embodiments are also contemplated wherein the compression spring 180 is uncompressed when the ramp portion 104 is in the neutral position, and thus, provides no force F to counteract the moment $M_W$ imparted by the weight W of the ramp portion.

As the ramp portion 104 moves from the neutral position (FIG. 7) toward the stowed position (FIG. 6) the first bearing surface 138 moves along a first arcuate path, and the second bearing surface 139 moves along a second arcuate path. As a result of this movement, the second bearing surface 139 disengages from the second engagement surface 157, while the first bearing surface 138 remains engaged with the first engagement surface 156. Consequently, the entire force F provided by the compression spring 180 is reacted at the first bearing surface 138. The force F imparts a moment $M_f$ that counteracts the moment $M_W$ imparted by the weight W of the ramp portion 104. The magnitude of moment $M_f$ is equal to the force F times the distance $d_1$ between the line of action of force F and the center of rotation of the crank assembly 132. As the ramp portion 104 moves toward the stowed position, the drive element 140 slides relative to the restraint 160 so that the distance between the spring fitting 146 and the end stop 166 decreases. As the spring fitting 146 and the end stop 166 move closer together, the end stop moves a first end of the compression spring 180 toward a second end of the spring, i.e., the spring fitting 146 compresses the compression spring 180 against the end stop 166. As the compression spring 180 is further compressed, the force F provide by the spring and thus, the moment $M_f$ imparted by the force F, increase. The force F biases the ramp portion toward the deployed position by imparting a moment $M_f$ that counteracts the moment $M_W$ imparted by the weight W of the ramp portion 104, wherein the magnitude of moment $M_f$ is equal to the force F times the distance $d_1$ between the line of action of the force F and the center of rotation of the crank assembly 132.

As the ramp portion 104 moves from the neutral position (FIG. 7) toward the a deployed position (FIG. 8) the first bearing and second bearing surfaces 138 and 139 move along the first and second arcuate paths, respectively. The first bearing surface 138 disengages from the first engagement surface 156, while the second bearing surface 139 remains engaged with the first engagement surface 157. Movement of the ramp portion 104 toward a deployed position drives the spring fitting 146 toward the end stop 166, thereby compressing the compression spring 180. As a result, the compression spring 180 provides a force F that results in a moment $M_f$ that biases the ramp portion toward the stowed position. As the ramp moves further toward the deployed position, i.e., away from the stowed position, the compression on the compression spring 180 and thus, the force F provided by the spring increase.

The compression spring 180 is preferably sized such that when the ramp portion 104 reciprocates between the stowed position and a deployed position, compression of the compression spring 180 imparts a force F of a magnitude such that $M_F$ approximates $M_W$. In this regard, the compression spring 180 may have a constant stiffness or a variable stiffness.

In addition, the first and second bearing surfaces 138 and 139 can be selectively positioned to provide a desired moment profile as the ramp portion 104 moves from the stowed position to a deployed position. For example, by positioning the bearing surfaces 138 and 139 so that the radius of the arcuate path traveled by one bearing surface is greater than the radius of the arcuate path traveled by the other bearing surface, the moment $M_F$ imparted by a force F can be varied depending upon whether the ramp portion 104 is between the neutral position and the stowed position, or between the neutral position and a deployed position. Further, varying the distance of a particular bearing surface from the center of rotation of the crank assembly 132 in the direction of the centerline of the spring 180 allows for selectively controlling the change in the distance between the line of action of the force and center of rotation of the crank assembly 132, i.e., the moment arm, as the ramp portion 104 reciprocates between the stowed position and a deployed position. Various embodiments are contemplated including one embodiment wherein the first and second arcuate paths traveled by the first and second bearing surfaces 138 and 139, respectively, have a common center (the center of rotation of the crank assembly 132), and wherein the first and second bearing surfaces are positioned asymmetrically to each other with respect to a horizontal plane that contains that center.

By selecting a spring and the positions of the first and second bearing surfaces to minimize the difference between $M_F$ and $M_W$, the output requirement on the motor is reduced, allowing for a smaller, more compact motor. Manual operation effort is also reduced.

Figure 9:
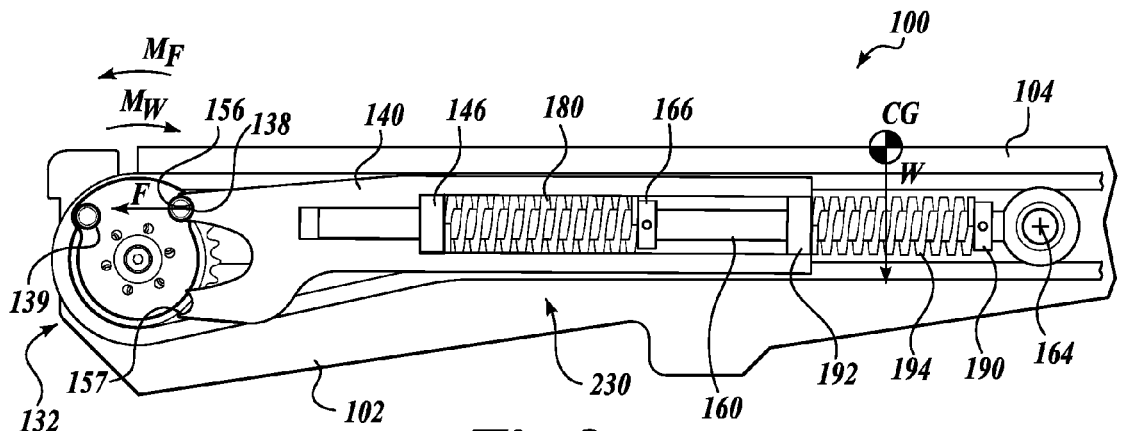
FIG. 9 shows a side view of a second exemplary embodiment of the counterbalance assembly of FIG. 1, with the ramp portion in the stowed position.
Figure 10:
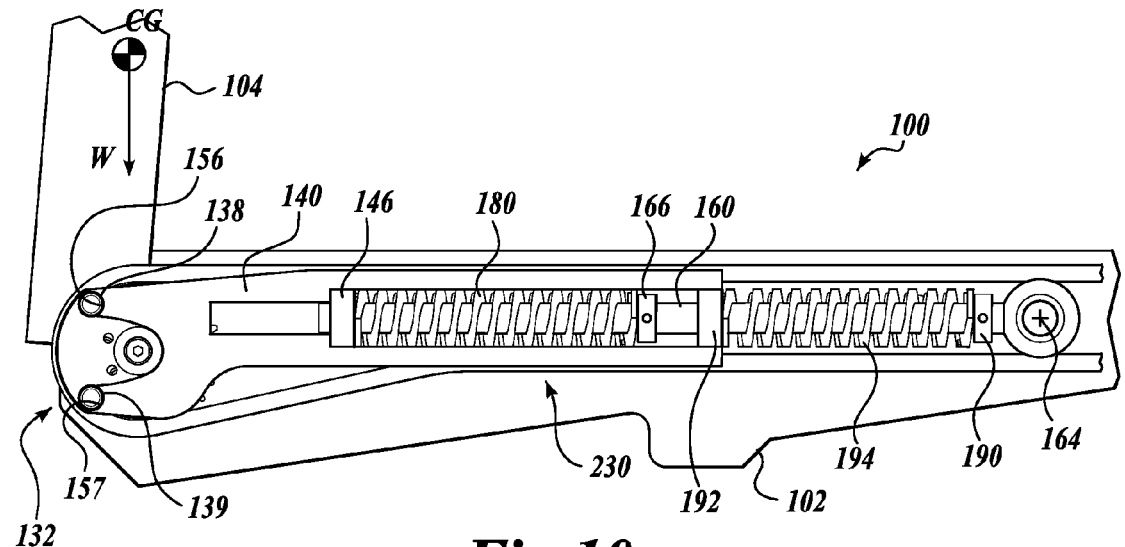
FIG. 10 shows a side view of the counterbalance assembly of FIG. 9, with the ramp portion in the neutral position.
Figure 11:
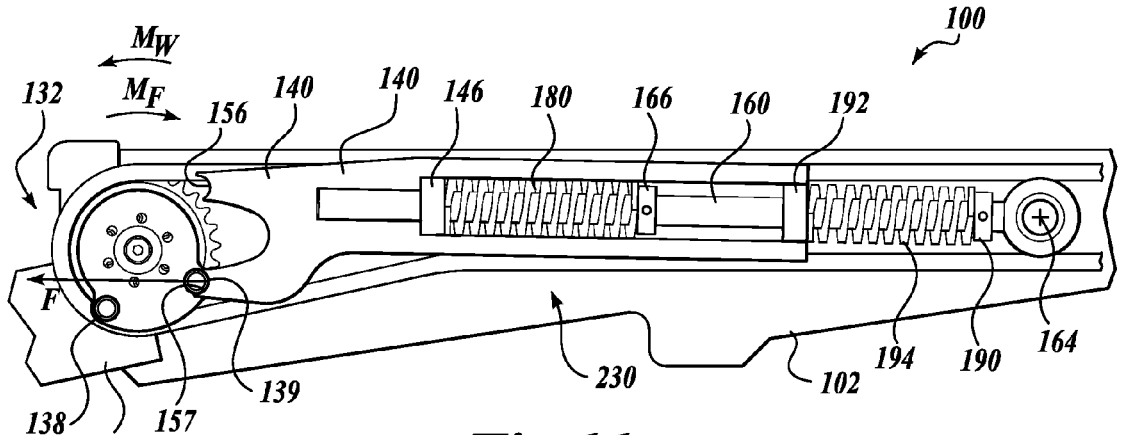
FIG. 11 shows a side view of the counterbalance assembly of FIG. 9, with the ramp portion in a deployed position.

FIGS. 9-11 show a second embodiment of a counterbalance assembly 230 similar to the counterbalance assembly 130 shown in FIGS. 4-8, but with a second spring in parallel to the first spring to provide additional force to counterbalance the weight of the ramp portion 104. In addition to the structure described with respect to counterbalance assembly 130, counterbalance 230 further includes a second end stop 190 associated with the restraint 160, a second spring fitting 192 associated with the drive element 140, and a second compression spring 194 disposed therebetween. Movement of the ramp portion from the neutral position (FIG. 10) toward either the stowed position (FIG. 9) or a deployed position (FIG. 11) compresses the first and second compression springs 180 and 194. The combined force F resulting from the compression of the first and second compression springs 180 and 194 biases the ramp toward the neutral position, thus reducing or eliminating the force required from the motor to counteract the weight of the ramp portion.

Figure 12:
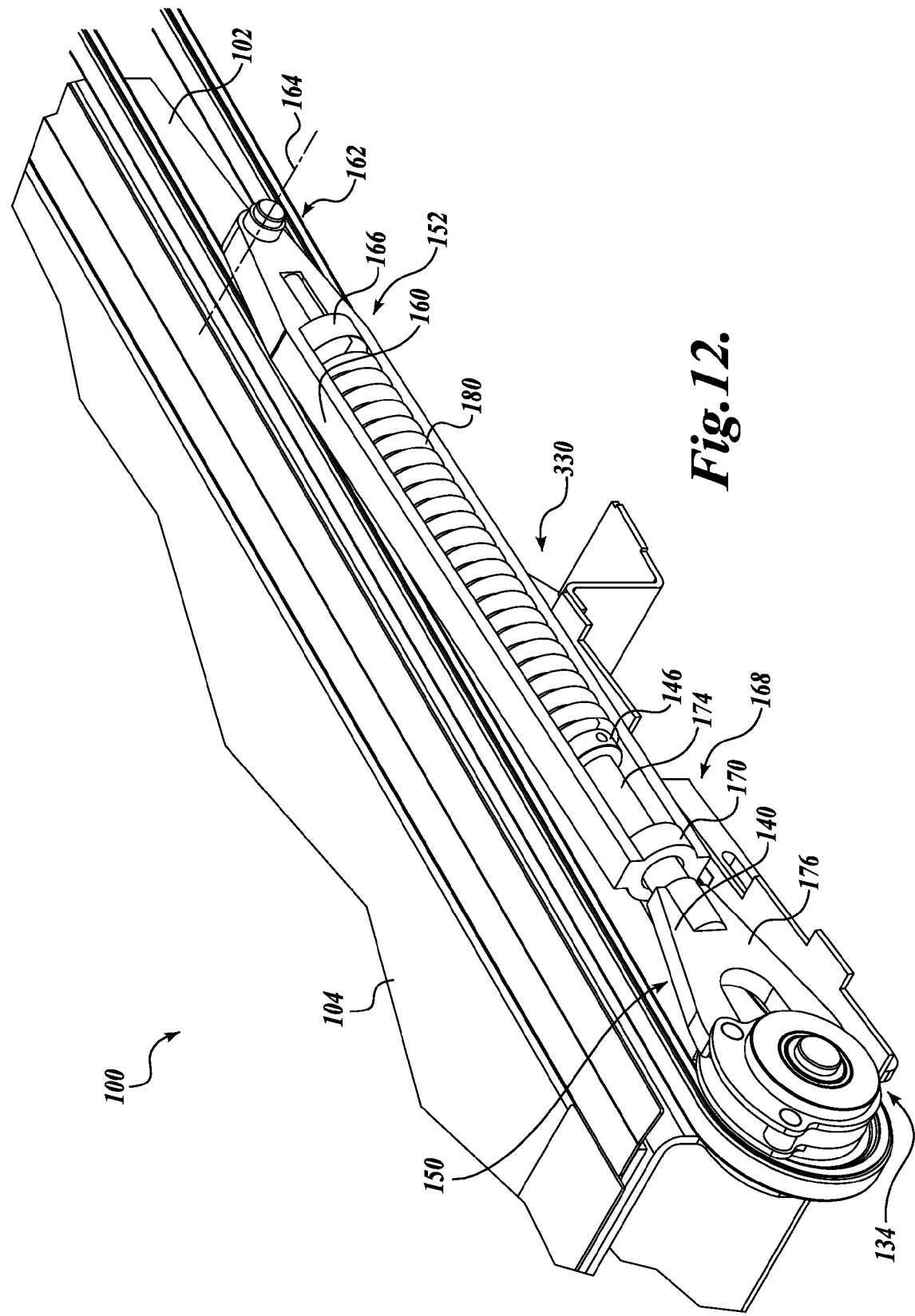
FIG. 12 shows an isometric view of a third exemplary embodiment of the counterbalance assembly of FIG. 1.
Figure 13:
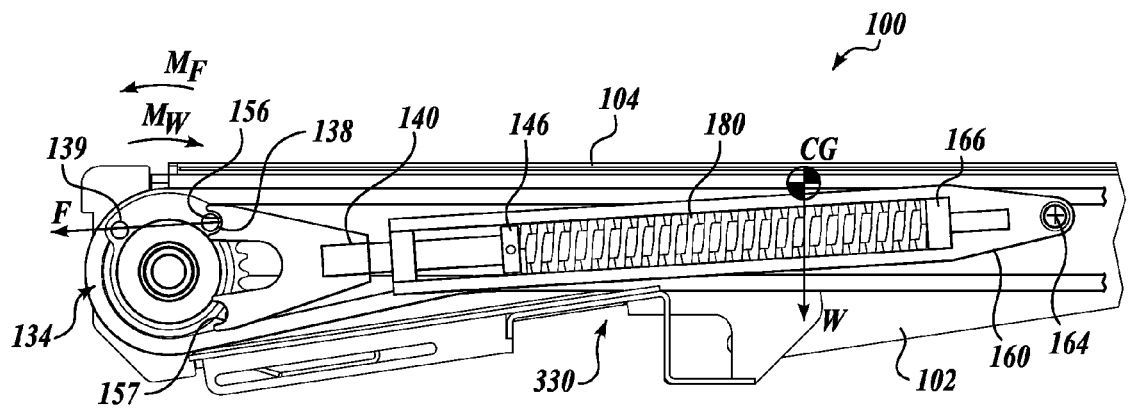
FIG. 13 shows a side view of the counterbalance assembly of FIG. 12, with the ramp portion in the stowed position.
Figure 14:
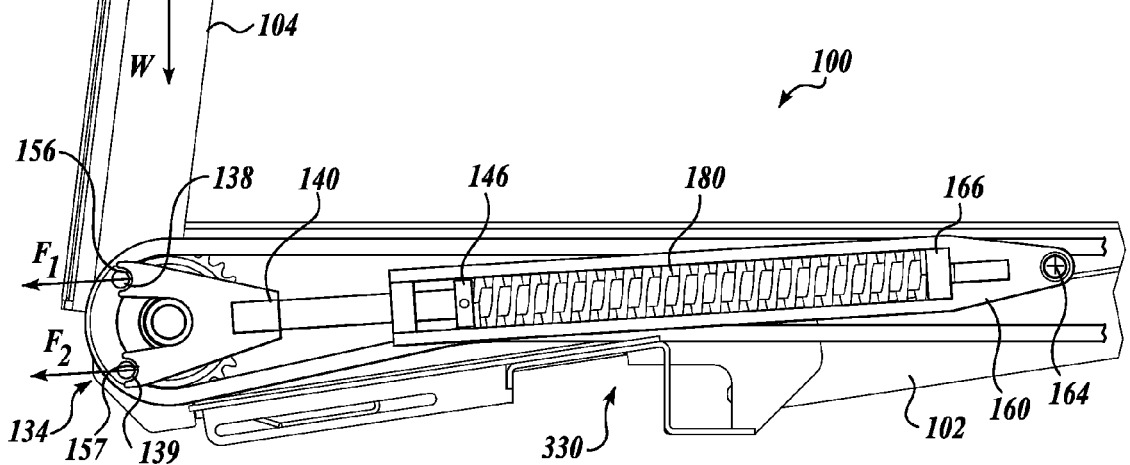
FIG. 14 shows a side view of the counterbalance assembly of FIG. 12, with the ramp portion in the neutral position.
Figure 15:
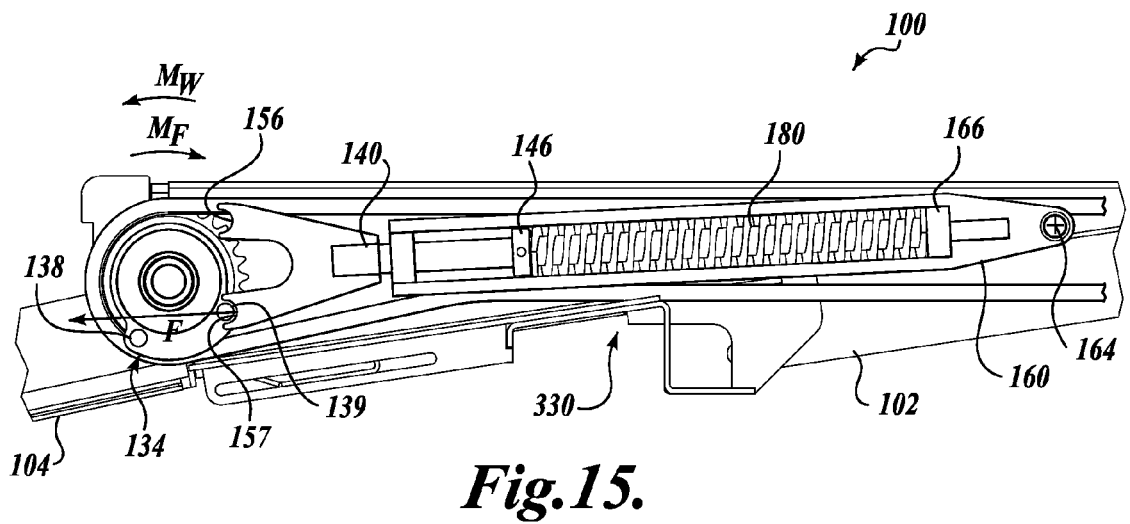
FIG. 15 shows a side view of the counterbalance assembly of FIG. 12, with the ramp portion in a deployed position.

FIGS. 12-15 show a third exemplary embodiment of a counterbalance assembly 330. Referring to FIG. 12, the counterbalance assembly 330 is similar to the counterbalance assembly 130 shown in FIG. 4. The counterbalance assembly 330 includes a crank assembly 134 similar to the crank assembly of counterbalance assembly 130. The crank assembly 134 is operably coupled to the ramp portion 104 so that movement of the ramp portion 104 toward the stowed position rotates the crank assembly in a first direction, and movement of the ramp portion toward the deployed position rotates the crank assembly in a second direction.

A restraint 160 (illustrated as an elongate body similar to the drive member 140 of counterbalance assembly 130) is coupled at a proximal end 162 for rotatable movement about an axis of rotation 164 that has a fixed position relative to the neutral position of the ramp portion 104. The restraint 160 includes a guide 170 located at the distal end 168 and end stop 166 located near the proximal end 162.

The drive element 140 includes a rod 174 coupled to an engagement fitting 176 at a proximal end 150 of the drive element. First and second engagement surfaces 156 and 157 are disposed on the engagement fitting 176 and are sized and configured to engage the first and second bearing surfaces 138 and 139, respectively, of the crank assembly 134. A spring fitting 146 is located on the rod 174. It should be appreciated that the rod 174, the engagement fitting 176 and the spring fitting 146 (or any combination thereof) can be formed as an integral unit and such embodiments should be considered within the scope of the present disclosure.

A compression spring 180 is disposed between the spring fitting 146 and the end stop 166. In the illustrated embodiment, the drive element 140 is slidably coupled to the restraint 160, and the rod 174 of the drive element 140 is concentrically disposed within the compression spring 180.

When the ramp portion 104 moves from the neutral position (FIG. 14) toward the stowed position (FIG. 13), the second bearing surface 139 disengages from the second engagement surface 157, and the first bearing surface 138 remains engaged with the first engagement surface 156 to drive the spring fitting 146 toward the end stop 166. The movement of the spring fitting 146 moves the first end of the compression spring 180 toward the second end of the compression spring. This compression of the compression spring 180 produces a force F that tends to bias the ramp portion 104 toward a deployed position. Similarly, when the ramp portion 104 moves from the neutral position to a deployed position (FIG. 15), the first bearing surface 138 disengages from the first engagement surface 156, and the second bearing surface 139 remains engaged with the second engagement surface 157 to drive the spring fitting 146 toward the end stop 166. Movement of the spring fitting 146 toward the end stop 166 compresses the compression spring 180, so that the compression spring 180 provides a force F that tends to bias the ramp portion 104 toward the stowed position.

Figure 16:
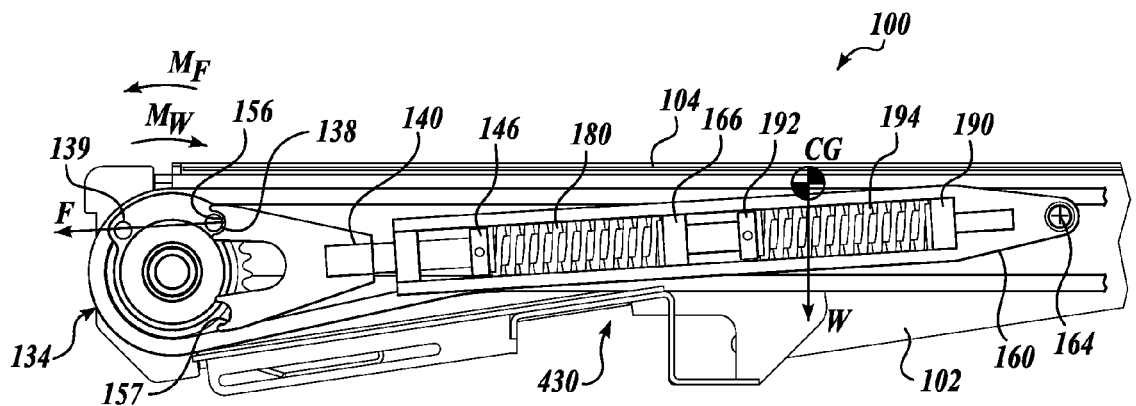
FIG. 16 shows a side view of a fourth exemplary embodiment of the counterbalance assembly of FIG. 1, with the ramp portion in the stowed position.
Figure 17:
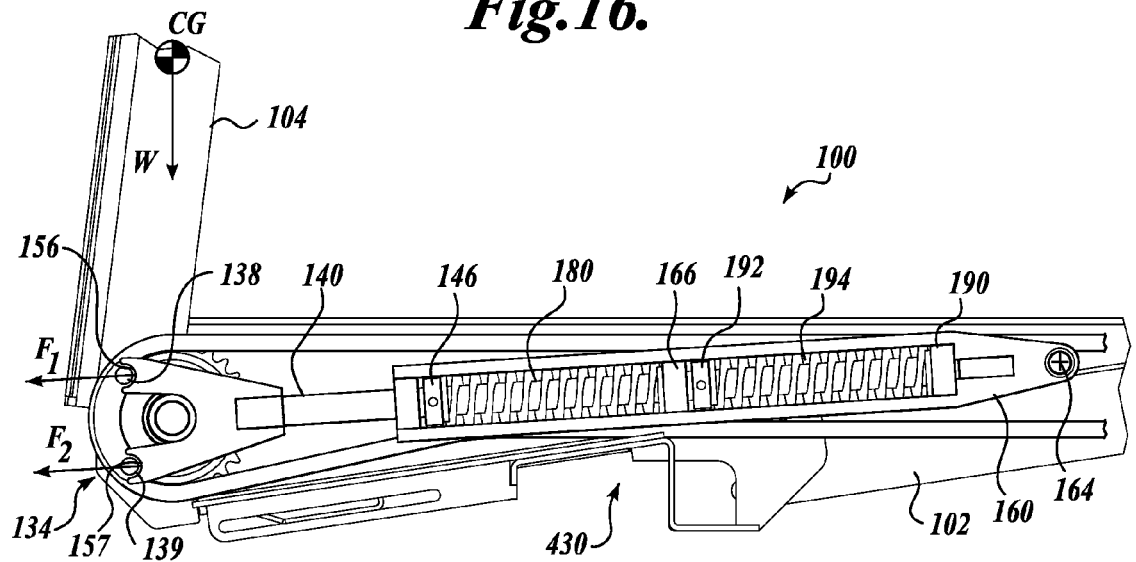
FIG. 17 shows a side view of the counterbalance assembly of FIG. 16, with the ramp portion in the neutral position.
Figure 18:
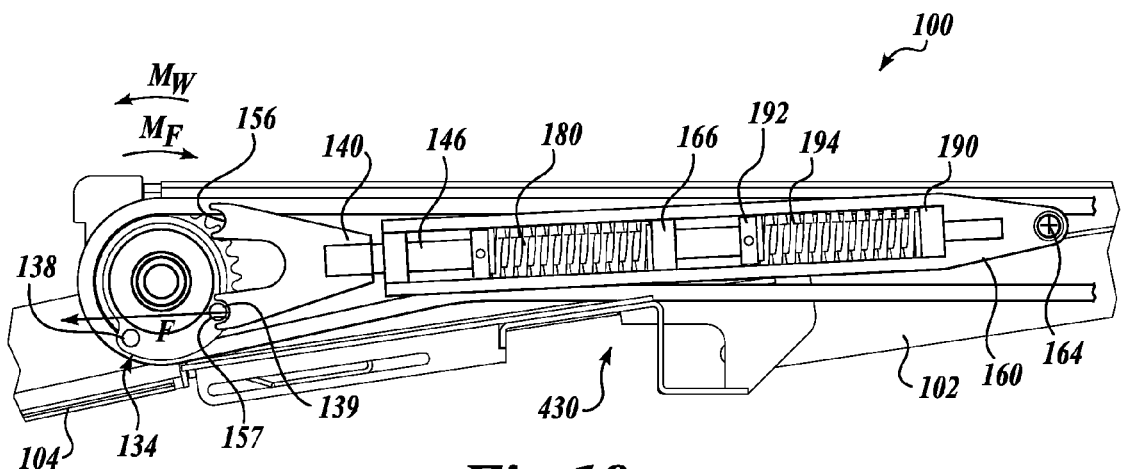
FIG. 18 shows a side view of the counterbalance assembly of FIG. 16, with the ramp portion in a deployed position.

FIGS. 16-18 show a fourth embodiment of a counterbalance assembly 430 similar to the counterbalance assembly 330 shown in FIGS. 12-15, but with a second spring in parallel to the first spring to provide additional force to counterbalance the weight of the ramp portion 104. In addition to the structure described with respect to counterbalance assembly 330, counterbalance 430 further includes a second end stop 190 associated with the restraint 160, a second spring fitting 192 associated with the drive element 140, and a second compression spring 194 disposed therebetween. Movement of the ramp portion from the neutral position (FIG. 17) toward either the stowed position (FIG. 16) or a deployed position (FIG. 18) compresses the first and second compression springs 180 and 194. The combined force F resulting from the compression of the first and second compression springs 180 and 194 biases the ramp toward the neutral position, thus reducing or eliminating the force required from the motor to counteract the weight of the ramp portion.

While illustrative embodiments have been illustrated and described, it will be appreciated that various changes can be made therein without departing from the spirit and scope of the invention.

The embodiments of the invention in which an exclusive property or privilege is claimed are defined as follows:

1. A ramp assembly, comprising:
    (a) a ramp portion configured for reciprocating movement between a stowed position, a deployed position, and a neutral position; and
    (b) a counterbalance associated with the ramp portion, comprising:
        (i) first and second bearing surfaces, movement of the ramp portion between the stowed position and the deployed position moving the first bearing surface along a first arcuate path and moving the second bearing surface along a second arcuate path;
        (ii) a restraint rotatably coupled about a first axis of rotation, the first axis of rotation having a fixed position relative to the neutral position of the ramp portion;
        (iii) a drive element slidably coupled to the restraint, the drive element comprising: (1) a first engagement surface for engaging the first bearing surface; (2) a second engagement surface for engaging the second bearing surface; and (3) a spring fitting; and
        (vi) a compression spring disposed between a portion of the restraint and the spring fitting, wherein the compression spring provides a force to bias the ramp portion (1) toward the stowed position when the ramp portion is between the deployed position and the neutral position, and (2) toward the deployed position when the ramp portion is between the stowed position and the neutral position.

2. The ramp assembly of claim 1, wherein the first bearing surface engages the first engagement surface when the ramp is between the neutral position and the stowed position and is disengaged from the first engagement surface when the ramp portion is between the neutral position and the deployed position.

3. The ramp assembly of claim 2, wherein the second bearing surface engages the second engagement surface when the ramp is between the neutral position and the deployed position and is disengaged from the second engagement surface when the ramp portion is between the neutral position and the stowed position.

4. The ramp assembly of claim 1, wherein the drive element further comprises:
   a) an engagement fitting, wherein the first and second engagement surfaces are disposed on the engagement fitting; and
   (b) a rod having a first end attached to the engagement fitting and a second end upon which the spring fitting is disposed.

5. The ramp assembly of claim 4, wherein the rod is concentrically disposed within the compression spring.

6. The ramp assembly of claim 1, wherein the restraint comprises a rod rotatably coupled at a first end about the first axis of rotation and an end stop disposed on a second end of the rod.

7. The ramp assembly of claim 6, wherein the rod is concentrically disposed within the compression spring.

8. The ramp assembly of claim 1, wherein the first engagement surface comprises a first recess formed in the drive element, and the second engagement surface comprises a second recess formed in the drive element.

9. The ramp assembly of claim 1, wherein the drive element further comprises a second spring fitting, and wherein the restraint comprises first and second end stops, the counterbalance further comprising a second compression spring disposed between the second end stop and the second spring fitting, wherein the second compression spring provides a force to bias the ramp portion (i) toward the stowed position when the ramp portion is between the deployed position and the neutral position, and (ii) toward the deployed position when the ramp portion is between the stowed position and the neutral position.

10. The ramp assembly of claim 1, wherein each of the first and second bearing surfaces is defined by one of the group consisting of a pin and a bearing.

11. The ramp assembly of claim 1, wherein the first arcuate path defines a first radius, and the second arcuate path defines a second radius, the first radius being different than the second radius.

12. The ramp assembly of claim 1, wherein the first and second arcuate paths have a common center, and wherein the first and second bearing surfaces are positioned asymmetrically to each other with respect to a horizontal plane that contains the center.

* * * * *